United States Patent [19]
Suzuki et al.

[11] Patent Number: 5,895,708
[45] Date of Patent: Apr. 20, 1999

[54] MAGNETIC RECORDING MEDIUM

[75] Inventors: Kazuhiko Suzuki; Masahiro Sawaguchi; Satsuki Yamada; Yuko Abe, all of Miyagi, Japan

[73] Assignee: Sony Corporation, Tokyo, Japan

[21] Appl. No.: 08/869,484

[22] Filed: Jun. 5, 1997

[30] Foreign Application Priority Data

Jun. 6, 1996 [JP] Japan .................. 8-144355

[51] Int. Cl.⁶ .................. G11B 5/706
[52] U.S. Cl. .................. 428/216; 428/329; 428/336; 428/694 BA; 428/900
[58] Field of Search .................. 428/216, 329, 428/336, 694 BA, 900

[56] References Cited

U.S. PATENT DOCUMENTS

| | | |
|---|---|---|
| 4,075,384 | 2/1978 | Suzuki et al. .................. 428/212 |
| 4,463,034 | 7/1984 | Tokunaga et al. .................. 427/256 |
| 4,722,862 | 2/1988 | Ogawa et al. .................. 428/323 |

*Primary Examiner*—Stevan A. Resan
*Attorney, Agent, or Firm*—Hill & Simpson

[57] ABSTRACT

There is disclosed a magnetic recording medium which are not only excellent in chemical and magnetic stability, durability and traveling reliability but also has a good time index function. The magnetic recording medium according to the present invention includes a non-magnetic substrate and a magnetic layer formed on the non-substrate, the magnetic layer being composed mainly of $\gamma$—$Fe_2O_3$ and having a coercive force of 25 to 33 KA/m, a residual magnetic flux density of not less than 130 mT and a thickness of 1.5 to 2.0 μm, wherein the magnetic recording medium has a total thickness of not more than 6 μm, and is capable of recording thereon and/or reproducing therefrom a low frequency signal.

1 Claim, 1 Drawing Sheet

MAGNETIC RECORDING MEDIUM

BACKGROUND OF THE INVENTION

1. Field of the Invention

The present invention relates to a coating-type magnetic recording medium in which $\gamma$—$Fe_2O_3$ is used as a magnetic material, and more particularly to a micro-cassette tape for used in telephone-answering machine, tape recorders for conference system, or the like.

2. Prior Art

Conventionally, there have been extensively utilized coating-type magnetic recording media which are produced by applying a magnetic coating material onto a non-magnetic substrate and then drying the magnetic coating material. The magnetic coating material is prepared by dispersing a magnetic powder material such as an oxide-based magnetic powder or an alloy-based magnetic powder in an organic binder such as vinyl chloride-vinyl acetate-based copolymer, a polyester resin, an urethane resin, a polyurethane resin or the like.

Incidentally, as magnetic materials for micro-cassette tapes capable of long-term recording, such as 90 minute-recording micro-cassette tapes, the alloy-based magnetic powder have been generally used. The alloy-based magnetic powder has an extremely large coercive force and saturation magnetization as compared to the oxide-based magnetic powder. For this reason, the magnetic tape in which such an alloy-based magnetic powder is used as a magnetic material can exhibit a high coercive force and a high residual magnetic flux density.

However, since the alloy-based magnetic powder is a ferromagnetic metal alloy (Fe, Co, Ni) composed mainly of Fe, the magnetic powder exhibits a low stability against oxidation thereof, so that there arises a risk that the magnetic powder is burned or ignited upon handling. In addition, the alloy-based magnetic powder is apt to be coagulated during the production of the magnetic coating material. For this reason, when the alloy-based magnetic powder is used, the magnetic coating material suffers from the increase in viscosity thereof, thereby limiting the conditions for the production of magnetic tapes. Further, when the resultant magnetic tape is loaded in a tape recorder or the like and traveled therein, there also occurs a risk that a traveling reliability and durability of the magnetic tape are deteriorated due to the increase in frictional coefficient thereof.

In view of the afore-mentioned problems encountered in the prior art, the present inventors have paid their attention to $\gamma$—$Fe_2O_3$ because the material is excellent in chemical stability and magnetic stability and can produced with a low cost. However, $\gamma$—$Fe_2O_3$ is deteriorated in electromagnetic conversion characteristic as compared to the alloy-based magnetic powder. Further, in the case of the micro-cassette tape serving for a long-term recording, such as a 90 minute-recording micro-cassette tape, it is required that the magnetic layer thereof has a small thickness because the diameter of the wound tape must be limited to a small value. For this reason, especially, an operation of a time index function (i.e., the function capable of recording an information concerning recording date and time in an empty channel on a magnetic tape, or reproducing the information therefrom) which is generally provided in a micro-cassette tape recorder, is rendered unstable. This is because the time index function is provided by recording the information in the form of a low frequency signal in the order of 30 Hz/$-$30 dB and therefore highly influenced by a low-frequency sensitivity characteristic of the magnetic tape used.

SUMMARY OF THE INVENTION

The present invention has been proposed in order to overcome the afore-mentioned problems.

Accordingly, it is an object of the present invention to provide a magnetic recording medium capable of limiting a thickness of a magnetic layer thereof to a small level, and capable of suitably reproducing such a low-frequency signal information as used for a time index function of a micro-cassette tape recorder while maintaining inherent features of $\gamma$—$Fe_2O_3$ such as excellent chemical stability, excellent magnetic stability and inexpensiveness.

That is, in accordance with the present invention, there is provided a magnetic recording medium which comprises a non-magnetic substrate and a magnetic layer formed on the non-substrate, the magnetic layer being composed mainly of $\gamma$—$Fe_2O_3$ and having a thickness of 1.5 to 2.0 μm, a coercive force of 25 to 33 KA/m and a residual magnetic flux density of not less than 130 mT, wherein the magnetic recording medium has a total thickness of not more than 6 μm, and is capable of effectively recording thereon and/or reproducing therefrom a low frequency signal.

DETAILED DESCRIPTION OF THE INVENTION

Figure 1:
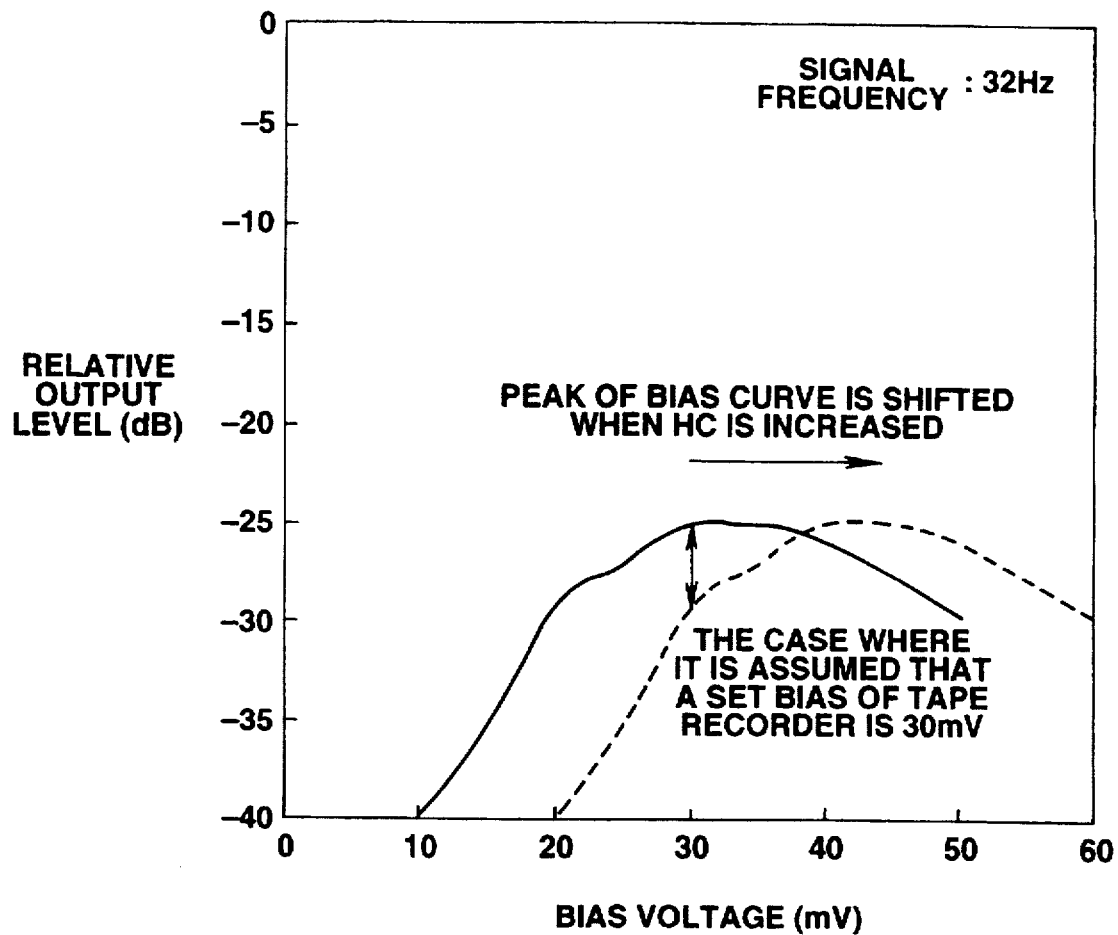
FIG. 1 is a characteristic curve showing change in sensitivity characteristic of a magnetic tape at a signal frequency of 32 Hz/$-$34 dB when a coercive force thereof is enhanced.

The magnetic recording medium according to the present invention can be effectively applied to a micro-cassette tape or the like whose thickness is limited to a small level because the micro-cassette tape must have a small diameter when it is wound up into a roll. The total thickness of the magnetic recording medium is limited to not more than 6 μm, and the thickness of the magnetic layer coated on the non-magnetic substrate is limited to not more than 2.0 μm. However, in the case where the thickness of the magnetic layer coated is less than 1.5 μm, the amount of magnetic flux on the magnetic tape becomes small even if the residual magnetic flux density thereof is in any range, so that it is impossible to ensure a good low-frequency sensitivity characteristic.

On the other hand, even if the thickness of the magnetic layer coated is not less than 1.5 μm, in the case where the residual magnetic flux density is less than 130 mT, the amount of magnetic flux on the magnetic tape also becomes small and therefore a good low-frequency sensitivity characteristic cannot be ensured. Accordingly, in order to ensure a sufficient amount of magnetic flux on the magnetic tape, it is required that the thickness of the magnetic layer coated is not less than 1.5 μm and the residual magnetic flux density thereof is not less than 130 mT.

However, even though the afore-mentioned requirements concerning both the thickness of the magnetic layer coated and the residual magnetic flux density thereof are satisfied, in the case where the coercive force of the magnetic layer is more than 33 KA/m, the bias point of the magnetic tape is shifted toward a lower output level with respect to a set bias of a micro-cassette tape recorder, so that an apparent low-frequency sensitivity characteristic of the magnetic tape is deteriorated. For this reason, the low-frequency signal cannot be sufficiently reproduced. Accordingly, it is preferred that the coercive force of the magnetic layer be not more than 33 KA/m.

Thus, since the magnetic layer of the magnetic recording medium according to the present invention is composed mainly of γ—$Fe_2O_3$ and has a coercive force, a residual magnetic flux density and a coating thickness which are controlled to the afore-mentioned optimum ranges, the magnetic recording medium is unlikely to ignite during the production process thereof, exhibits excellent chemical and magnetic stability, and enables a low-frequency signal to be suitably reproduced therefrom.

As described above, the feature of the magnetic recording medium according to the present invention resides in that the magnetic recording medium comprises a non-magnetic substrate and a magnetic layer formed on the non-substrate, the magnetic layer being composed mainly of γ—$Fe_2O_3$ and having a coercive force of 25 to 33 KA/m, a residual magnetic flux density of not less than 130 mT and a thickness of 1.5 to 2.0 μm, wherein the magnetic recording medium has a total thickness of not more than 6 μm, and is capable of effectively recording thereon and/or reproducing therefrom a low frequency signal.

The larger the residual magnetic flux density is, the more excellent magnetic properties of the magnetic recording medium can be attained. However, the upper limit of the practically usable residual magnetic flux density is 170 mT.

The γ—$Fe_2O_3$ magnetic material is generally deteriorated in electromagnetic conversion characteristic as compared to the alloy-based magnetic material. However, in accordance with the present invention, by controlling the coating thickness, the residual magnetic flux density Br and the coercive force Hc of the magnetic layer to optimum ranges, the magnetic recording medium exhibits not only chemical and magnetic stability but also low-frequency sensitivity characteristic as compared to those using conventional alloy-based magnetic materials. Further, the magnetic recording medium according to the present invention makes it possible to suitably reproduce a low-frequency signal therefrom, thereby enabling a time index function of a micro-cassette tape recorder to be suitably operated.

The magnetic recording medium to which the present invention is applied, may be of any configuration as far as a total thickness thereof is not more than 6 μm from the standpoint of satisfying the condition that the diameter of the wound tape must be limited to a small value. For example, the magnetic recording medium according to the present invention may be a recording medium constructed of a non-magnetic substrate and a magnetic layer formed thereon, a recording medium further having a top coat such as a protective layer or a lubricant layer on the magnetic layer, or the like, though not particularly limited thereto.

Further, as materials for the non-magnetic substrate and the binder used in the magnetic recording medium according to the present invention, any of conventionally known materials can be used.

For example, as materials for the non-magnetic substrate, there can be suitably used polyester resins such as polyethylene terephthalate, polyamide resins or the like.

As materials for the binder, there can be suitably used polymers or copolymers of vinylidene chloride, acrylic acid esters, methacrylic acid esters, styrene, butadiene, vinyl chloride-vinyl acetate, acrylonitrile, etc., polyurethane resins, polyester resins, or the like. The magnetic powder composed mainly of γ—$Fe_2O_3$ is admixed with and dispersed in such a binder to prepare a magnetic coating material for the magnetic layer of the magnetic recording medium according to the present invention. The magnetic layer may include, as additives, a dispersant, a lubricant, a hardening agent, an anti-static agent, a rust-preventive agent or the like, if required.

EXAMPLES

The present invention is described in detail below by way of examples in which 90 minute-recording micro-cassette tapes were prepared according to the afore-mentioned preferred embodiments of the present invention.

Example 1-1 to Example 10-4

| [Composition 1] | |
|---|---|
| γ-$Fe_2O_3$ magnetic powder | 100parts by weight |
| Vinyl chloride-vinyl acetate copolymer resin (Trade name "ESLEX-A" manufactured by Sekisui Kagaku Co., Ltd.) | 5parts by weight |
| Vinyl chloride-vinyl acetate copolymer resin (Trade name "MR-114AN" manufactured by Nippon Zeon Co., Ltd.) | 8parts by weight |
| Polyester-polyurethane resins | |
| (Trade name "SC-441" manufactured by Nippon Polyurethane Industry, Co., Ltd.) | 4parts by weight |
| (Trade name "MG-0707" manufactured by Toyobo Co., Ltd.) | 3parts by weight |
| Carbon black | |
| (Trade name "#80" manufactured by Asahi Carbon Co., Ltd.) | 1part by weight |
| (Trade name "DENKA BLACK" manufactured by Denki Kagaku Kogyo Co., Ltd.) | 2parts by weight |
| Lubricant | |
| (Trade name "SO-47" manufactured by Shin-Etsu Kagaku Kogyo Co., Ltd.) | 0.85part by weight |
| (Trade name "VLA-1" manufactured by Kawaken Fine Chemical Co., Ltd.) | 0.35part by weight |
| Olive oil | 0.35part by weight |
| Hardening agent (Trade name "COLONATE L-50" manufactured by Nippon Polyurethane Industry, Co., Ltd. | 10parts by weight |
| Methyl ethyl ketone | 150parts by weight |
| Toluene | 90parts by weight |
| Cyclohexane | 60parts by weight |

Raw materials having the above composition 1 were kneaded and agitated homogeneously (pre-mixing process), and thereafter intimately mixed together by a sand mill (sand mill process) to prepare a magnetic coating material. The thus-prepared magnetic coating material was applied onto polyester films and then subjected to a magnetic field orientation treatment. Thereafter, the magnetic coating material applied on each polyester film was dried to form a magnetic layer thereon. As a result, 90 minute-recording micro-cassette tapes formed with the magnetic layer having a thickness of 1.5 to 2.0 μm, a residual magnetic flux density Br of 130 to 150 mT and a coercive force Hc of 25 to 33 KA/m, as shown Tables 1 and 2, were produced. Incidentally, the residual magnetic flux density Br and the coercive force Hc of the magnetic layer of each micro-cassette tape were controlled by varying the time for which the magnetic coating material was subjected to the sand mill process.

TABLE 1

| Example No. | Thickness of magnetic layer coated | Residual magnetic flux density Br (mT) | Coercive force Hc (KA/m) |
| --- | --- | --- | --- |
| Example 1-1 | 1.5 | 130 | 25 |
| Example 1-2 | 1.5 | 130 | 28 |
| Example 1-3 | 1.5 | 130 | 30 |
| Example 1-4 | 1.5 | 130 | 33 |
| Example 2-1 | 1.5 | 140 | 25 |
| Example 2-2 | 1.5 | 140 | 28 |
| Example 2-3 | 1.5 | 140 | 30 |
| Example 2-4 | 1.5 | 140 | 33 |
| Example 3-1 | 1.5 | 150 | 25 |
| Example 3-2 | 1.5 | 150 | 28 |
| Example 3-3 | 1.5 | 150 | 30 |
| Example 3-4 | 1.5 | 150 | 33 |
| Example 4-1 | 1.5 | 160 | 25 |
| Example 4-2 | 1.5 | 160 | 28 |
| Example 4-3 | 1.5 | 160 | 30 |
| Example 4-4 | 1.5 | 160 | 33 |
| Example 5-1 | 1.5 | 170 | 25 |
| Example 5-2 | 1.5 | 170 | 28 |
| Example 5-3 | 1.5 | 170 | 30 |
| Example 5-4 | 1.5 | 170 | 33 |

| Example No. | Time index function | Durability | Traveling reliability |
| --- | --- | --- | --- |
| Example 1-1 | O | O | O |
| Example 1-2 | O | O | O |
| Example 1-3 | O | O | O |
| Example 1-4 | O | O | O |
| Example 2-1 | O | O | O |
| Example 2-2 | O | O | O |
| Example 2-3 | O | O | O |
| Example 2-4 | O | O | O |
| Example 3-1 | O | O | O |
| Example 3-2 | O | O | O |
| Example 3-3 | O | O | O |
| Example 3-4 | O | O | O |
| Example 4-1 | O | O | O |
| Example 4-2 | O | O | O |
| Example 4-3 | O | O | O |
| Example 4-4 | O | O | O |
| Example 5-1 | O | O | O |
| Example 5-2 | O | O | O |
| Example 5-3 | O | O | O |
| Example 5-4 | O | O | O |

TABLE 2

| Example No. | Thickness of magnetic layer coated | Residual magnetic flux density Br (mT) | Coercive force Hc (KA/m) |
| --- | --- | --- | --- |
| Example 6-1 | 2.0 | 130 | 25 |
| Example 6-2 | 2.0 | 130 | 28 |
| Example 6-3 | 2.0 | 130 | 30 |
| Example 6-4 | 2.0 | 130 | 33 |
| Example 7-1 | 2.0 | 140 | 25 |
| Example 7-2 | 2.0 | 140 | 28 |
| Example 7-3 | 2.0 | 140 | 30 |
| Example 7-4 | 2.0 | 140 | 33 |
| Example 8-1 | 2.0 | 150 | 25 |
| Example 8-2 | 2.0 | 150 | 28 |
| Example 8-3 | 2.0 | 150 | 30 |
| Example 8-4 | 2.0 | 150 | 33 |
| Example 9-1 | 2.0 | 160 | 25 |
| Example 9-2 | 2.0 | 160 | 28 |
| Example 9-3 | 2.0 | 160 | 30 |
| Example 9-4 | 2.0 | 160 | 33 |
| Example 10-1 | 2.0 | 170 | 25 |
| Example 10-2 | 2.0 | 170 | 28 |
| Example 10-3 | 2.0 | 170 | 30 |
| Example 10-4 | 2.0 | 170 | 33 |

| Example No. | Time index function | Durability | Traveling reliability |
| --- | --- | --- | --- |
| Example 6-1 | O | O | O |
| Example 6-2 | O | O | O |
| Example 6-3 | O | O | O |
| Example 6-4 | O | O | O |
| Example 7-1 | O | O | O |
| Example 7-2 | O | O | O |
| Example 7-3 | O | O | O |
| Example 7-4 | O | O | O |
| Example 8-1 | O | O | O |
| Example 8-2 | O | O | O |
| Example 8-3 | O | O | O |
| Example 8-4 | O | O | O |
| Example 9-1 | O | O | O |
| Example 9-2 | O | O | O |
| Example 9-3 | O | O | O |
| Example 9-4 | O | O | O |
| Example 10-1 | O | O | O |
| Example 10-2 | O | O | O |
| Example 10-3 | O | O | O |
| Example 10-4 | O | O | O |

Comparative Example 1

A 90 minute-recording micro-cassette tape was produced in the same manner as in Example 1 except that $\gamma$—$Fe_2O_3$ of the composition 1 was changed to the alloy-based magnetic powder. The thus-produced 90 minute-recording micro-cassette tape was formed with a magnetic layer having a thickness of 1.5 μm, a residual magnetic flux density Br of 320 mT and a coercive force Hc of 51 KA/m, as shown in Table 3.

Comparative Examples 2-1 to 4-2

The micro-cassette tapes were produced from the same composition 1 as used in Example 1, except that the coating thickness of the magnetic layer formed in each micro-cassette tape was out of the range of 1.5 to 2.0 μm, the residual magnetic flux density thereof was out of the range of 130 to 150 mT and the coercive force thereof was out of the range of 25 to 33 KA/m, as shown in Table 3.

TABLE 3

| Example No. | Thickness of magnetic layer coated | Residual magnetic flux density Br (mT) | Coercive force Hc (KA/m) |
|---|---|---|---|
| Comparative Example 1 | 1.5 | 320 | 51 |
| Comparative Example 2-1 | 0.5 | 110 | 28 |
| Comparative Example 2-2 | 0.5 | 120 | 28 |
| Comparative Example 2-3 | 0.5 | 130 | 28 |
| Comparative Example 2-4 | 0.5 | 140 | 28 |
| Comparative Example 2-5 | 0.5 | 150 | 28 |
| Comparative Example 2-6 | 0.5 | 160 | 28 |
| Comparative Example 2-7 | 0.5 | 170 | 28 |
| Comparative Example 3-1 | 1.0 | 110 | 28 |
| Comparative Example 3-2 | 1.0 | 120 | 28 |
| Comparative Example 3-3 | 1.0 | 130 | 28 |
| Comparative Example 3-4 | 1.0 | 140 | 28 |
| Comparative Example 3-5 | 1.0 | 150 | 28 |
| Comparative Example 3-6 | 1.0 | 160 | 28 |
| Comparative Example 3-7 | 1.0 | 170 | 28 |
| Comparative Example 4-1 | 1.5 | 110 | 28 |
| Comparative Example 4-2 | 1.5 | 120 | 28 |

| Example No. | Time indeX function | Durability | Traveling reliability |
|---|---|---|---|
| Comparative Example 1 | O | — | — |
| Comparative Example 2-1 | X | O | O |
| Comparative Example 2-2 | X | O | O |
| Comparative Example 2-3 | X | O | O |
| Comparative Example 2-4 | X | O | O |
| Comparative Example 2-5 | X | O | O |
| Comparative Example 2-6 | X | O | O |
| Comparative Example 2-7 | X | O | O |
| Comparative Example 3-1 | X | O | O |
| Comparative Example 3-2 | X | O | O |
| Comparative Example 3-3 | X | O | O |
| Comparative Example 3-4 | X | O | O |
| Comparative Example 3-5 | X | O | O |
| Comparative Example 3-6 | X | O | O |
| Comparative Example 3-7 | X | O | O |
| Comparative Example 4-1 | X | O | O |
| Comparative Example 4-2 | X | O | O |

Reference Examples 1-1 to 4-5

The micro-cassette tapes were produced from the same composition 1 as used in Example 1, except that the coercive force thereof was out of the range of 25 to 33 KA/m, though the coating thickness of the magnetic layer formed in each micro-cassette tape was maintained within the range of 1.5 to 2.0 μm and the residual magnetic flux density thereof was maintained within the range of 130 to 150 mT, as shown in Tables 4 and 5.

TABLE 4

| Example No. | Thickness of magnetic layer coated | Residual magnetic flux density Br (mT) | Coercive force Hc (KA/m) |
|---|---|---|---|
| Reference Example 1-1 | 1.5 | 130 | 35 |
| Reference Example 1-2 | 1.5 | 140 | 35 |
| Reference Example 1-3 | 1.5 | 150 | 35 |
| Reference Example 1-4 | 1.5 | 160 | 35 |
| Reference Example 1-5 | 1.5 | 170 | 35 |
| Reference Example 2-1 | 1.5 | 130 | 38 |
| Reference Example 2-2 | 1.5 | 140 | 38 |
| Reference Example 2-3 | 1.5 | 150 | 38 |
| Reference Example 2-4 | 1.5 | 160 | 38 |
| Reference Example 2-5 | 1.5 | 170 | 38 |

| Example No. | Time indeX function | Durability | Traveling reliability |
|---|---|---|---|
| Reference Example 1-1 | X | O | O |
| Reference Example 1-2 | X | O | O |
| Reference Example 1-3 | X | O | O |
| Reference Example 1-4 | X | O | O |
| Reference Example 1-5 | X | O | O |
| Reference Example 2-1 | X | O | O |
| Reference Example 2-2 | X | O | O |
| Reference Example 2-3 | X | O | O |
| Reference Example 2-4 | X | O | O |
| Reference Example 2-5 | X | O | O |

TABLE 5

| Example No. | Thickness of magnetic layer coated | Residual magnetic flux density Br (mT) | Coercive force Hc (KA/m) |
|---|---|---|---|
| Reference Example 3-1 | 2.0 | 130 | 35 |
| Reference Example 3-2 | 2.0 | 140 | 35 |
| Reference Example 3-3 | 2.0 | 150 | 35 |

TABLE 5-continued

| Reference Example | | | |
|---|---|---|---|
| Reference Example 3-4 | 2.0 | 160 | 35 |
| Reference Example 3-5 | 2.0 | 170 | 35 |
| Reference Example 4-1 | 2.0 | 130 | 38 |
| Reference Example 4-2 | 2.0 | 140 | 38 |
| Reference Example 4-3 | 2.0 | 150 | 38 |
| Reference Example 4-4 | 2.0 | 160 | 38 |
| Reference Example 4-5 | 2.0 | 170 | 38 |
| Example No. | Time indeX function | Durability | Traveling reliability |
| Reference Example 3-1 | X | ○ | ○ |
| Reference Example 3-2 | X | ○ | ○ |
| Reference Example 3-3 | X | ○ | ○ |
| Reference Example 3-4 | X | ○ | ○ |
| Reference Example 3-5 | X | ○ | ○ |
| Reference Example 4-1 | X | ○ | ○ |
| Reference Example 4-2 | X | ○ | ○ |
| Reference Example 4-3 | X | ○ | ○ |
| Reference Example 4-4 | X | ○ | ○ |
| Reference Example 4-5 | X | ○ | ○ |

The thus-produced micro-cassette tapes were evaluated for operations of the time index function, the durability and the traveling reliability thereof.

Incidentally, the operation of time index function of each micro-cassette tape was evaluated by determining whether a character information recorded on the respective micro-cassette tapes could be effectively reproduced or not. The evaluation of the time index function was carried out by using two tape recorders respectively manufactured by Olimpus Co., Ltd. and Sony Corp. The evaluation results of the time index function were classified into two ranks, i.e., in the case where the character information could be read out, the tape was determined to be a first rank "good" as shown by a mark "○" in the above Tables 1 to 5, while, in the case where the character information could not be read out, the tape was determined to be a second rank "not good" as shown by the mark "X" in the above Tables 1 to 5. In addition, the durability of each micro-cassette tape was evaluated by determining a numerical value indicative of an amount of powder scraped off the tape when traveled 50 times against a fixed head. The numerical values indicative of the amount of powder scraped off the respective tapes were compared with each other by using the numerical value for the micro-cassette tape obtained in Comparative Example 1 as a reference value. Also, the traveling reliability of each micro-cassette tape was evaluated by determining a numerical value indicative of a traveling resistance thereof. The numerical values indicative of the traveling resistance of the respective tapes were compared with each other by using the numerical value for the micro-cassette tape obtained in Comparative Example 1 as a reference value. In the case of the durability and the traveling reliability, the evaluations results were classified into three ranks. That is, in the case where these properties were compared to those of the micro-cassette tape obtained in Comparative Example 1, superior ones were marked by "○"; identical ones were marked by "Δ"; and inferior ones were marked by "X", in the above Tables 1 to 5.

As is appreciated from Tables 1 and 2, 90 minute-recording micro-cassette tapes whose magnetic layers had a thickness of 1.5 to 2.0 μm, a residual magnetic flux density Br of 130 to 150 mT and a coercive force Hc of 25 to 33 KA/m (Examples 1 to 10) made it possible to perform the time index function in an effective manner, and were superior in both durability and traveling reliability to the conventional micro-cassette tape (Comparative Example 1).

On the other hand, the 90 minute micro-cassette tapes of Comparative Examples 2 and 3 whose magnetic layers had thicknesses of 0.5 μm and 1.0 μm, respectively, were insufficient in amount of magnetic flux thereon in any range of the residual magnetic flux density, so that the micro-cassette tapes of Comparative Examples 2 and 3 could not ensure a satisfactory low-frequency sensitivity and therefore could not perform the time index function. In addition, in the case of the 90 minute-recording micro-cassette tape of Comparative Example 4 whose coating thickness was not less than 1.5 μm but whose residual magnetic flux density was less than 130 mT, the amount of magnetic flux on the micro-cassette tape was also insufficient, so that the tape could not ensure a satisfactory low frequency sensitivity and therefore could not perform the time index function.

Further, in the case of the 90 minute-recording micro-cassette tapes of Comparative Examples 5 to 8 whose coating thickness and residual magnetic flux density were in required ranges but whose coercive force was more than 33 KA/m, the bias point of the magnetic tape was shifted toward a lower output level with respect to a set bias of a micro-cassette tape recorder, so that the low-frequency sensitivity of the tape was apparently deteriorated and therefore the time index function thereof could not be perform in an effective manner.

As is appreciated from these results, nevertheless the $\gamma$—$Fe_2O_3$ magnetic material is deteriorated in electromagnetic conversion characteristic as compared to the alloy-based magnetic material, in accordance with the present invention, by controlling the coating thickness, the residual magnetic flux density Br and the coercive force Hc of the magnetic layer composed of $\gamma$—$Fe_2O_3$ to optimum values, there can be produced a 90 minute-recording micro-cassette tape which is not only excellent in durability and traveling reliability but also can satisfactorily perform the time index function of a micro-cassette tape recorder.

As described above, the magnetic recording medium according to the present invention has a magnetic layer composed mainly of $\gamma$—$Fe_2O_3$, and the magnetic layer has a coercive force, a residual magnetic flux density and a coating thickness which all are controlled to optimum values. For this reason, the magnetic recording medium according to the present invention has less risk of igniting during the production thereof and is more excellent in chemical and magnetic stability and durability as compared to those composed of conventional alloy-based magnetic materials, and can be produced with a low cost. Further, the magnetic recording medium according to the present invention makes it possible to reproduce a low-frequency signal in a suitable manner, so that it can satisfactorily perform a time index function of a micro-cassette tape recorder.

What is claimed is:

1. A magnetic recording medium comprising:

a non-magnetic substrate; and a magnetic layer formed on said non-magnetic substrate, said magnetic layer comprising mainly $\gamma$—$Fe_2O_3$ and having a coercive force of 25 to 33 KA/m, a residual magnetic flux density of from about 130 mT to about 170 mT and a thickness of 1.5 to 2.0 μm, said magnetic recording medium having a total thickness of not more than 6 μm and being capable of recording thereon and/or reproducing therefrom a low frequency signal of about 30 Hz/−30 dB associated with a time index function.

* * * * *